United States Patent
Lohneis et al.

(10) Patent No.: US 10,859,749 B2
(45) Date of Patent: Dec. 8, 2020

(54) OPTICAL WAVEGUIDE FOR USE WITH A CABLE OR LINE

(71) Applicant: LEONI Kabel GmbH, Roth (DE)

(72) Inventors: Michael Lohneis, Ebensfeld (DE); Arthur Krueger, Coburg (DE)

(73) Assignee: LEONI Kabel GmbH, Roth (DE)

( * ) Notice: Subject to any disclaimer, the term of this patent is extended or adjusted under 35 U.S.C. 154(b) by 0 days.

(21) Appl. No.: 16/203,315

(22) Filed: Nov. 28, 2018

(65) Prior Publication Data

US 2020/0166685 A1 May 28, 2020

(51) Int. Cl.
| | |
|---|---|
| *G02B 6/44* | (2006.01) |
| *F21V 8/00* | (2006.01) |
| *F16L 9/00* | (2006.01) |
| *G02B 6/02* | (2006.01) |
| *G02B 6/036* | (2006.01) |
| *H01B 9/00* | (2006.01) |

(52) U.S. Cl.
CPC .............. *G02B 6/001* (2013.01); *F16L 9/00* (2013.01); *G02B 6/0006* (2013.01); *G02B 6/02052* (2013.01); *G02B 6/03694* (2013.01); *H01B 9/005* (2013.01)

(58) Field of Classification Search
CPC .... G02B 6/443; G02B 6/4401; G02B 6/4486; G02B 6/4495; G02B 6/44
See application file for complete search history.

(56) References Cited

U.S. PATENT DOCUMENTS

| 5,463,706 | A | 10/1995 | Dumont et al. |
| 7,242,822 | B2 * | 7/2007 | Yamada ........... B29D 11/00663 385/14 |
| 2013/0209045 | A1 | 8/2013 | Dean, Jr. et al. |
| 2015/0122542 | A1 * | 5/2015 | Wenger ................. F21V 21/008 174/70 R |

FOREIGN PATENT DOCUMENTS

| EP | 2 871 708 A1 | 5/2015 |
| WO | WO 2005/106899 A1 | 11/2005 |
| WO | WO 2017/015084 A1 | 1/2017 |

OTHER PUBLICATIONS

International Search Report and Written Opinion dated Sep. 11, 2019 in corresponding International Application No. PCT/IB2019/000332.

* cited by examiner

*Primary Examiner* — Jennifer Doan
(74) *Attorney, Agent, or Firm* — Joseph V. Saphia; Haug Partners LLP

(57) ABSTRACT

Cable/line systems and related methods are provided. The cable/line systems include at least one central cable and an optical waveguide surrounding the cable. The optical waveguide includes an inner cladding, a core, and an outer cladding. Scattering structures are dispersed within the optical waveguide. The optical waveguide is configured to scatter light by way of the scattering structures away from the core to emit radial lighting along the length of the optical waveguide. The spectrum and/or luminance of the emitted light is controlled according to properties of the cable/line.

16 Claims, 2 Drawing Sheets

OPTICAL WAVEGUIDE FOR USE WITH A CABLE OR LINE

FIELD OF THE INVENTION

This disclosure relates generally to an optical waveguide. In particular, this disclosure relates to an optical waveguide configured to surround a cable/line for emitting radial lighting.

BACKGROUND OF THE INVENTION

There is a growing need to provide intelligent cable systems. For example, it would be advantageous to provide a cable/line that indicates to a user certain information. This could be accomplished, among other ways, by providing visual indications pertaining to the cable/line. Such a visual indication could advantageously be carried out by radially emitting light, out of the cable along its length so that the cable glows. However, cables necessarily should be robust and flexible, so as to be used in a variety of applications (e.g., data transmission, power transmission, etc.). Including light-emitting elements in such a cable would reduce its overall flexibility, as well as increase manufacturing costs.

Side-light emitting optical fibers are known for their ability to radially emit light along the length of the fiber. Traditionally, side-light emitting fibers include a glass core, a cladding, and a protective jacket. Scattering elements are often placed within the fiber core, along its length, so that when light is input into an end of the fiber, the light scatters and is emitted radially along the fiber's length. However, such side-light emitting fibers often require a large diameter in order to provide sufficient luminance along the length of the fiber. This large diameter leads to a stiffening of the fiber, which reduces its bending radius. Additionally, an input end of such fibers needs to be polished so that light can be efficiently input into the fiber. Such side-light emitting fibers would not be beneficial to be used with the aforementioned cables, as this would lead to reduced bending tolerances and inefficient coupling of a light source to the fiber.

Thus, there is a need for a light-emitting device capable of radiating light that can be easily incorporated with standardized cables without adversely affecting the cables properties. Such a light-emitting device should also be easily assembled to the cable.

SUMMARY OF THE INVENTION

Various illustrative embodiments of the present disclosure provide a light-emitting device and related methods. In accordance with one aspect of an illustrative embodiment of the present disclosure, the light-emitting device may include at least one optical waveguide and at least one light source, where the optical waveguide is configured to surround a cable/line.

According to a first aspect of the invention, the optical waveguide may comprise an inner cladding, a core and an outer cladding. The optical core may be arranged around the inner cladding. The outer cladding may be arranged around the optical core. The inner cladding may include light reflective properties. The optical core may include light conductive properties. The outer optical cladding may include light-scattering and light-reflecting properties.

According to the first aspect of the invention, light is configured to propagate through the optical core. Light that impinges upon the inner cladding may be reflected back into the optical core such that the inner cladding may be configured to be completely (or nearly completely) light reflective. Light that impinges upon the outer cladding may be at least partially reflected back into the core and also partially scattered and emitted out of the optical waveguide.

The optical waveguide according to the first aspect of the invention may include two claddings, the inner cladding and the outer cladding. The inner cladding and the outer cladding can serve to guide light by at least partially reflecting light. This allows light to be reflected back into the optical core and propagate longitudinally along the optical core. Additionally, light is at least partially scattered out of the waveguide by way of the outer cladding. In this way the optical wave guide is configured to emit light into the environment along a length of its outer surface.

According to embodiments, the outer cladding may have scattering particles to achieve scattering properties. For example, the optical waveguide can create a laterally radiating effect through the targeted integration of scattering particles into the outer cladding. Light coupled into the outer cladding from the optical core may be scattered by the scattering particles and thereby emitted to the environment. The scattering particles allow for the efficient scattering and radiation of light. According to further embodiments, other configurations for achieving the scattering properties are within the scope of the invention.

According to aspects of the invention, the cable/line that the optical wave guide is configured to be surrounded by, can be any type of cable. For example, the cable may be used as an electrical cable, e.g., be designed as a power cable. The cable may alternatively be designed as a hose for fluid, e.g., gases or liquids. Alternative types of cables/line are within the scope of this disclosure.

According to an aspects of the invention, emitting light out of the optical waveguide can be understood as meaning that the light is scattered on or in the outer optical cladding in such a way that it leaves the outer cladding and reaches the environment surrounding the optical waveguide. According to further aspects of the invention, the optical waveguide can be configured to emit light on one side or select portions of the optical waveguide.

According to aspects of the invention, the optical waveguide may be applied to the cable. According to embodiments, the optical waveguide may be extrudable or windable on the cable. According to these embodiments, the inner cladding may have an inner diameter tuned to the cable/line. As a result, it is possible to apply the inner cladding, and thus the optical waveguide, to the cable/line. The optical waveguide may be applied to the cable in such a way that the inside of the inner cladding rests against the outside of the cable/line. According to embodiments, the inner diameter of the inner optical cladding may substantially correspond to the outer diameter of the cable/line. In this way, the inner diameter of the inner cladding is approximately equal to the outer diameter of the cable/line. This provides a simple and firm application of the optical waveguide to the cable. According to alternative embodiments, the inner diameter of the inner optical cladding may be smaller than the outer diameter of the cable/line so as to create a friction fit between the optical waveguide and the cable/line.

According to aspects of the invention, the optical waveguide may have a generally annular or ring-like shape, where an opening of the shape can be filled by the cable/line. According to further aspects of the invention, the optical waveguide may have a planar shape, or take other shapes (e.g., irregular shapes, polygonal shapes, etc.) and subsequently be formed around a cable/line.

According to aspects of the invention, one or more light-emitting elements may be located next to at least a portion of the optical core. According to embodiments at least one outer surface of at least one of the one or more light-emitting elements is adjacent to and/or abuts the optical core. According to further embodiments, the one or more light-emitting elements are placed adjacent to individual sections of the optical core. The one or more light-emitting elements may be controllable in dependence on environmental light. According to embodiments, external sensors are implemented, which can detect the lighting conditions of the environment, and the light-emitting elements can be controlled according to the detection results. For example, in a brighter environment, the light-emitting elements may be controlled to emit light of higher intensity (or greater luminance) so that the light emitted by the optical waveguide is clearly visible despite the brighter environment. Similarly, in a darker environment, the intensity or the luminance of the light emitted from the light-emitting elements can be reduced.

According to aspects of the invention, the one or more light-emitting elements may each abut/contact the outer cladding. According to embodiments, at least one of the light-emitting elements may be located adjacent at least a portion of the optical core such that light emitted from at least one of the light emitting elements directly impinges upon the outer cladding. As a result, the coupling of the light from the optical core into the outer cladding can take place at least virtually without loss. According to further embodiments, at least one light-emitting element is coupled to a distal end of the optical wave guide.

According to embodiments where at least one of the light-emitting elements are located next to at least a portion of the optical core of the optical wave guide, a thickness of the one or more light-emitting elements may be approximately the same as the thickness (in the radial direction) of the optical core. In other words, the light-emitting elements may be arranged so that their edge length coincides with the thickness of the optical core. As a result, the coupling of the light from the optical core into the outer cladding can take place at least virtually without loss. In this way, light can be coupled directly from the light-emitting elements into the outer optical cladding.

The wavelength of the light emitted by the light-emitting elements may be in the visible and/or non-visible spectrum. According to embodiments, the emitted light can cover one or more spectral regions of the color spectrum. For example, a light-emitting element can emit light in the red color spectrum, a light-emitting element can emit light in the green color spectrum, and/or a light-emitting element can emit light in the blue color spectrum. In the case of RGB emission of light and corresponding RGB coupling into the outer optical cladding, a clearly recognizable and intuitively readable visual indication can be realized. According to alternative embodiments, the light-emitting elements may emit light with the same wavelength or light in the same color spectrum. According to still further embodiments, the emitted light is not in the visible spectrum (e.g., UV or IR).

According to embodiments of the invention, a jacket with light-homogenizing properties can be arranged around the outer cladding.

According to aspects of the invention, by coupling light into the optical core and emitting at least a portion of the light from the outer cladding, the optical waveguide can serve as a visual or intelligent conduit for a variety of applications. According to embodiments, for example, the optical waveguide may be implemented with a charging cable so as to provide an integrated status display. According to further embodiments, the optical waveguide may be implemented for monitoring of hazardous chemical lines, for example, in laboratories. Other applications are within the scope of the present disclosure.

According to embodiments, the light-emitting elements may be arranged in a ring-like configuration within the optical wave guide such that a central passage of the optical waveguide is created. This central passage may accommodate an actual medium to be transported, e.g., electricity in a power cable or gas or liquid in a hose.

According to aspects of the invention, the spectrum and luminance of light emitted by the light emitting elements is controlled based upon information related to the cable/line that the optical waveguide surrounds. In the case of a charging cable, for example a charging cable of a smartphone, visual effects may created by the optical waveguide according to signals from the smartphone. This may create special lighting. For example, if the battery charge of the smartphone is weak, a red color signal may be emitted by the optical waveguide. In a normal charging cycle a yellow flashing color signal may be emitted by the optical waveguide, and in the case of a fully charged battery a green color signal may be displayed via the optical waveguide. According to further embodiments, the luminance of the light-emitting elements may be modified according to the ambient light of the environment by means of environmental sensors (e.g., sensors built into the smartphone).

According to these embodiments, controlling of the spectrum and luminance of light emitted by the light emitting elements is controlled by an electronic circuit (e.g., a microprocessor, an electronic controller, etc.). According to certain embodiments, the electronic circuit supplies a control signal to the one or more light-emitting elements through wires that power the light-emitting elements. According to other embodiments, dedicated signal wires are connected to the one or more light-emitting elements. The electronic circuit may be programmed to control the spectrum and luminance according to programming embedded in a non-transitory memory device (e.g., RAM) connected to the electronic circuit. The programming may be preconfigured and/or may be user configurable.

According to aspects of the invention, various effects can be achieved with the optical waveguide. For example, the outer cladding can shine along its entire longitudinal and circumferential extension. The coupling surface can be substantially increased, whereby the coupling efficiency is increased. Furthermore, a simple assembly of the optical waveguide and thus the light-emitting device is possible. In addition, a robust construction of the optical waveguide and the complete cable arrangement is possible. Although some of the above-described aspects and details have been described with respect to specific aspects and embodiments, these aspects and embodiments can also be realized in differing configurations. The present disclosure will be further explained with reference to figures.

BRIEF DESCRIPTION OF THE DRAWINGS

The following description, given by way of example and not intended to limit the invention to the disclosed details, is made in conjunction with the accompanying drawings, in which like references denote like or similar elements and parts, and in which.

DETAILED DESCRIPTION

Detailed embodiments of the present a light-emitting system, and methods are disclosed herein; however, it is to be understood that the disclosed embodiments are merely illustrative of a light-emitting system, and methods that may be embodied in various forms. In addition, each of the examples given in connection with the various embodiments of the systems and methods are intended to be illustrative, and not restrictive. Further, the drawings and photographs are not necessarily to scale, and some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present light emitting system, and methods.

Figure 1:
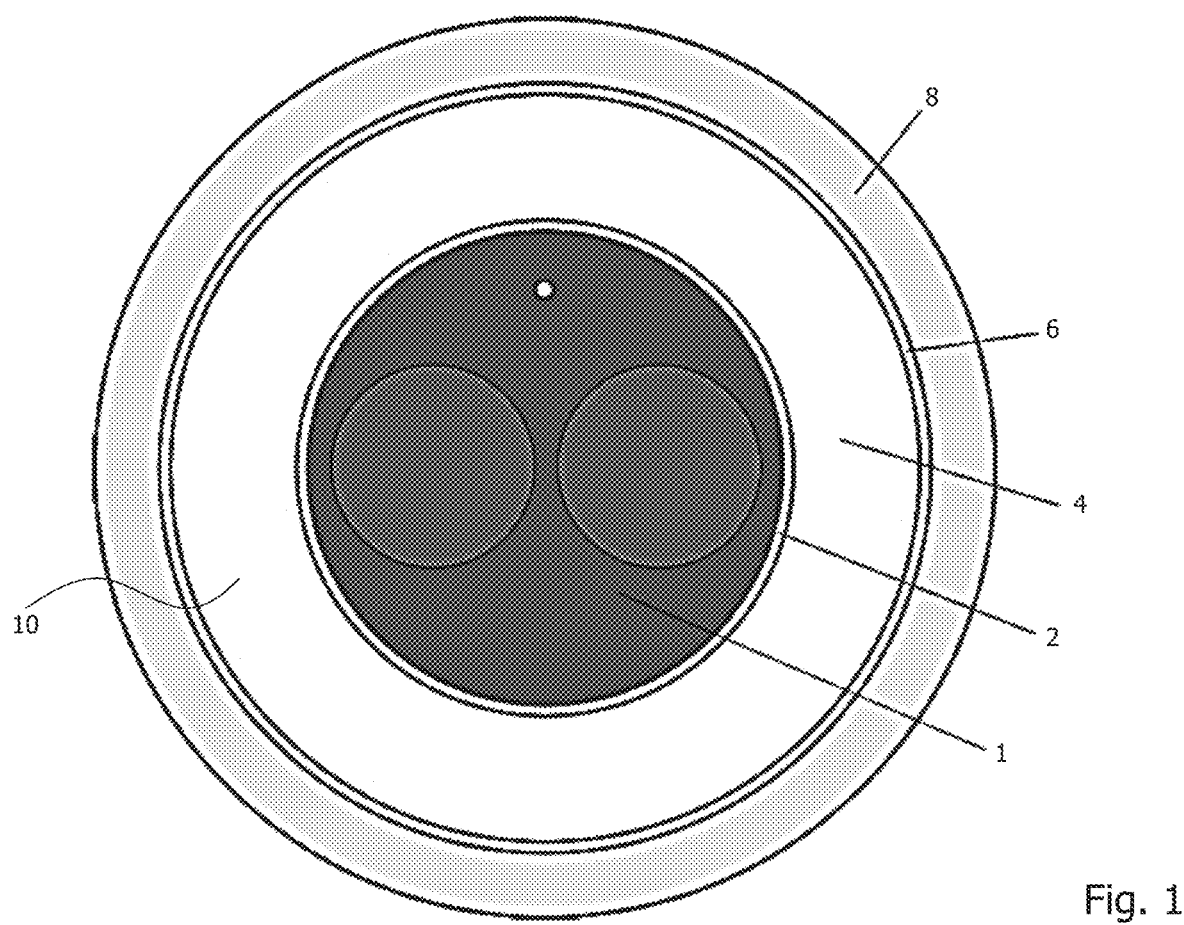
FIG. 1 illustrates a waveguide surrounding a cable of a light emitting device of the present disclosure.

With reference to FIG. 1, an embodiment of a light-emitting device of the present disclosure is illustrated. The light-emitting device may include an optical wave guide 10, which surrounds a cable 1. As illustrated by FIG. 1, according to this embodiment, optical waveguide 10 surrounds cable 1 in the radial direction around its entire circumference. Although not shown in FIG. 1, the optical fiber 10 may extend longitudinally and along the entire length of cable 1 or along only a portion of cable 1. By way of example, cable 1 of FIG. 1 is a data cable with two internal electrical conductors. However, cable 1 is not limited to this example and other types of cables/lines are within the scope of the present disclosure.

The optical waveguide 10 has an inner cladding 2, an optical core 4 and an outer cladding 6. The inner optical cladding 2 contacts and surrounds cable 1. The inner diameter of the inner cladding 2, according to embodiments, is matched to the outer diameter of the cable 1, In the example shown in FIG. 1, the inner diameter of the inner cladding 2 at least substantially corresponds to the outer diameter of the cable 1. In this way, the optical waveguide 10 can be fixedly mounted on cable 1. According to alternative embodiments, the inner diameter of the inner cladding 2 is smaller than the outer diameter of cladding 1 so as to create a friction fit between the optical waveguide 10 and the cable 1.

The optical core 4 is arranged around inner cladding 2. The inner diameter of the optical core 4, according to embodiments, is matched to the outer diameter of the inner optical cladding 2 (i.e., the inner diameter of the optical core 4 corresponds at least substantially to the outer diameter of inner cladding 2). The optical core 4 comprises a material with light-conducting properties. In other words, the optical core 4 is adapted to allow light to propagate therein and, for example, to guide light along its longitudinal axis. The material of optical core 4 may comprise one or more materials or fibers with light-conducting properties.

The outer optical cladding 6 is arranged around the optical core 4. The inner diameter of the outer optical cladding 6, according to embodiments, is matched to the outer diameter of the optical core 4 (i.e., the inner diameter of the outer cladding 6 corresponds at least substantially to the outer diameter of the optical core 4).

In the example of FIG. 1, the thickness (i.e., the radial thickness) of the optical core 4 (i.e., the radial thickness) is larger than the thickness of the inner cladding 2 as well as the thickness of the outer cladding 6. Additionally, inner cladding 2 and outer cladding 6 may have approximately the same thickness. Alternative dimensions for the inner cladding 2, optical core 4, and outer cladding 6 are within the scope of the present disclosure.

According to embodiments, optical core 4 may be configured to conduct light. According to certain embodiments, optical core 4 may be made from fused silica.

According to embodiments, inner cladding 2 may be made from material that includes light-reflecting properties. According to certain embodiments, inner cladding 2 may be configured to completely or nearly completely reflect light. In these embodiments, inner cladding 2 may be made from low index polymer. For example, inner cladding 2 may comprise a hard clad material, silicone, or the like.

According to embodiments, outer cladding 4 may be made from materials such that it includes both light-reflecting and light-scattering properties. According to certain embodiments, outer cladding 4 comprises a polymer substrate and a plurality of light scattering structures (not shown). The polymer substrate of the cladding may comprise a translucent polymer, for example, an acrylic polymer and the light scatter structures may comprise metallic particles, for example, aluminum oxide ($AlO_2$) particles and/or titanium oxide particles ($TiO_2$). According to further embodiments, light scatter structures may comprise other light reflecting particles, for example, silicon dioxide particles ($SiO_2$). According to still further embodiments, light scatter structures may take the form of voids formed in outer cladding 6. The voids may be filled with a gas or mixture of gases that can scatter light. The light scatter structures may be dispersed within the acrylic polymer substrate. According to alternative embodiments, polymer substrate may comprise a combination of (i) 2-(perfluorohexyl)ethyl methacrylate, (ii) 2-propenoic acid, 2-methyl, 2-ethyl-2-[[(2-methyl-1-oxo-2-propenyl)oxy]methyl]-1,3-propanedlyl ester, (iii) methanone, (1-hydroxycyclohexyl)phenyl-, (iv) Phenol, 2.6bis(1,1-dimethylethyl)-4-methylphenol, and (v) polyperfluoroEthoxymethoxy Difluoro Ethyl PEG Ether. According to further embodiments, polymer substrate includes a translucent, low index, curable polymer, such as silicone.

According to embodiments, light scatter structures may be randomly dispersed within polymer substrate. According to alternative embodiments, light scatter structures may be dispersed within polymer substrate with a regular pattern. Regardless of the specific orientation, light scatter structures may be generally homogenously dispersed within polymer substrate. Such homogeneity helps to ensure that optical waveguide 10 radially emits light along its length at a constant or near constant luminance.

According to further embodiments, light-scattering elements may be located within optical core 4 or at the boundary of optical core 4 and outer cladding 6, for example, in a coating located at the interface of optical core 4 and outer cladding 6.

Optical waveguide 10, according to embodiments, is configured to both scatter light and allow light to propagate. By way of example, optical wave guide 10, as described in the above embodiments, is configured to allow light to propagate through optical core 4 unimpeded. Light that impinges upon inner cladding 2 is reflected back into optical core 4. Light that impinges upon outer cladding 6 is at least partially scattered out of waveguide 10 and partially reflected back into optical core 4. In this way, optical waveguide 10 is configured to radially emit light to the environment along its entire length.

Figure 2:
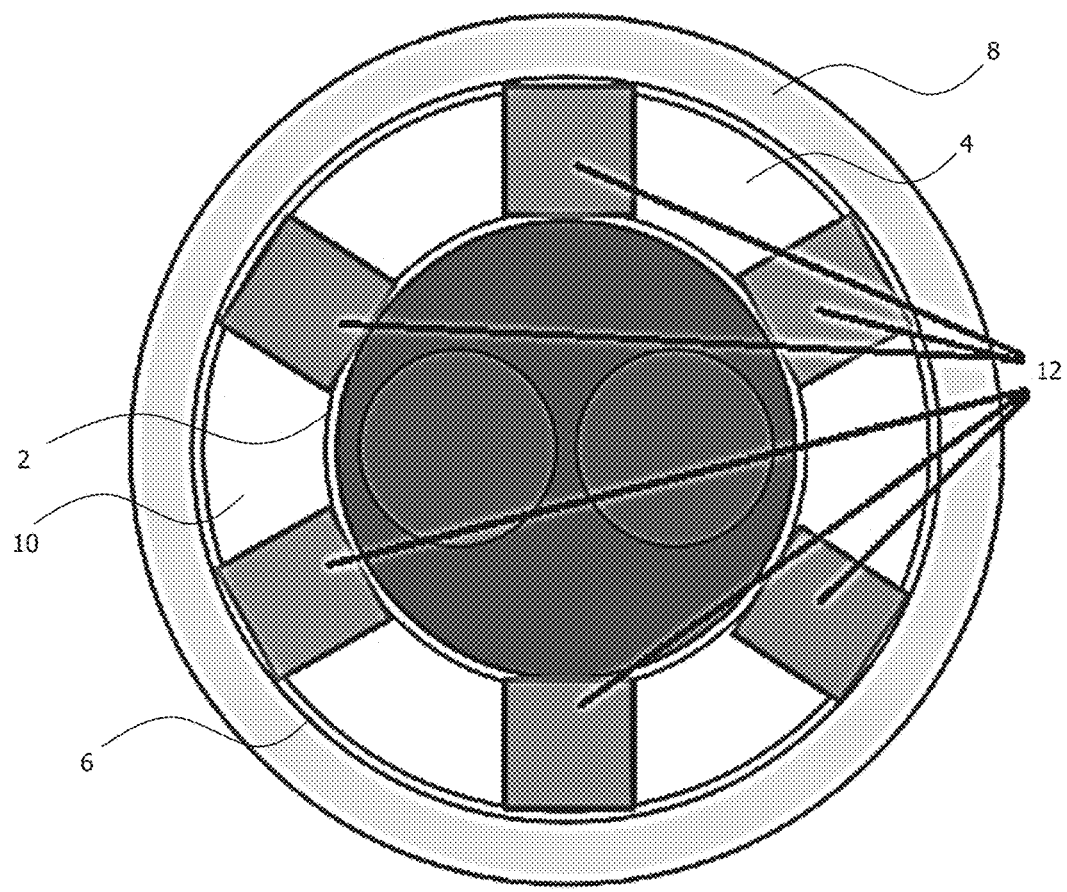
FIG. 2 illustrates a waveguide with embedded light-emitting elements surrounding a cable of a light emitting device of the present disclosure.

According to embodiments, optical waveguide 10 may further include an outer jacket 8. Jacket 8 may be configured to surround outer cladding 6, as illustrated in FIGS. 1 and 2. The inner diameter of jacket 8 may be matched to the outer diameter of outer cladding 6. Jacket 8 may comprise a polymer. The polymer of the jacket may be a transparent plastic. The transparent plastic may comprise ethylene tetrafluoroethylene (ETFE) (e.g., Tefzel®), Nylon, PVC, PA, acrylate polymers or other suitable translucent/transparent polymers. ETFE provides the advantage of being a highly transparent material while also be easy to clean during maintenance. Jacket 8 may also be configured to homogenize light that is scatted out of optical waveguide 10 so that the emitted light is constant along the length of the light emitting device.

With reference to FIG. 2, an alternative embodiment of a light-emitting system of the present disclosure is illustrated. The light-emitting system may include an optical wave guide 10, which surrounds a cable 1. As illustrated by FIG. 2, according to this embodiment, optical waveguide 10 surrounds cable 1 in the radial direction around its entire circumference. Although not shown in FIG. 2, the optical fiber 10 may extend longitudinally and along the entire length of cable 1 or along only a portion of cable 1. By way of example, cable 1 of FIG. 1 is a data cable with two internal electrical conductors. However, the cable 1 is not limited to this example. Inner cladding 2, outer cladding 6, and jacket 8 may be the same as those described with reference to the embodiment of FIG. 1, and thus, the description of these features will be omitted with reference to the embodiment of FIG. 2.

According to embodiments of FIG. 2, a plurality of light-emitting elements 12 (e.g., light emitters, or light sources) are arranged in optical waveguide 10. The light-emitting elements 12 are arranged in a ring around cable 1. In other words, the light emitting elements 12 are circumferentially spaced from each other. In the circumferential direction, the light-emitting elements 12, for example, each have an equal distance from each other. As can be seen in FIG. 2, the light-emitting elements 12 are designed and arranged such that their edge length coincides with the thickness (in the radial direction) of the optical core 4. Thus, a coupling of light in the outer optical cladding can be done relatively lossless.

The plurality of light-emitting elements 12, according to the embodiments of FIG. 2, may be located next to at least a portion of the optical core 4. At least one outer surface of at least one of the one or more light-emitting elements may be adjacent to and/or abut the optical core 4. According to further embodiments, the one or more light-emitting elements are placed adjacent to individual sections of the optical core 4. For example, optical core 4 may be formed by an extrusion process, resulting in a ring-like shaped (or planar) element. Portions of the optical core 4 may then be removed, for example, by laser removal techniques, so as to create channels or grooves where the plurality of light-emitting elements 12 are to be located. Additional portions of the optical core may also be removed to accommodate wiring necessary for the light-emitting elements 12 to function. According to an alternative example, optical core 4 may be formed so as to create a plurality of individual core elements with spaces therebetween. The spaces may then be filled with the plurality of light-emitting elements 12. According to still further embodiments, the plurality of light-emitting elements 12 are embedded in optical core 4.

The light emitting elements 12 may be e.g., stripwise in sections or along the full length of the optical core 4 and the outer cladding 6. According to further embodiments, light-emitting elements 12 may only be located at one end of optical waveguide 10. In still further embodiments, the light-emitting elements 12 extend along optical core 4 along its full length.

However, the optical waveguide 10 is not limited to the arrangement of light-emitting elements 12 shown by way of example in FIG. 2. The arrangement may vary in number as well as arrangement and spectral range used. For example, only a single light-emitting element 12 may be used. The light-emitting elements 12 can emit light having the same or different wavelength, for example light in the visible or in the non-visible spectrum. Thus, a first light-emitting element 12 can emit light in the red color spectrum, a second light-emitting element 12 emits light in the green color spectrum, and a third light-emitting element 12 emits light in the blue color spectrum. As a result, an RGB color pattern may be created by optical waveguide 10. The RGB coupling enables the realization, according to certain embodiments, of a visual "Lifestyle" charging cable.

According to further embodiments, one or more light-emitting elements may be coupled to an end of optical waveguide 10. In such embodiments, light in the desired spectral range may be introduced into the optical core 4 at an end of the waveguide, e.g., at a beginning (seen in the longitudinal direction) of the optical waveguide.

Methods of attaching optical waveguide 10 to cable 1, purely by way of example, may include extruding optical waveguide 10 onto the media cable 1. Once extruded, optical waveguide 10 forms a cable arrangement with the cable 1. During or after the production of cable 1, the optical waveguide 10 can be extruded onto cable 1. However, other possible applications of the optical waveguide 10 on the media cable 1 are conceivable. For example, optical waveguide 10 can take be pre-formed into an annular shape and cable 1 can subsequently be mounted therein.

Optical waveguide 10 may be drawn on an arbitrary line, such as cable 1. Inner cladding 2 and outer cladding 6 are configured to guide and scatter light. The optical waveguide 10, thus, is configured to having a radiating effect, e.g., by the targeted integration of scattering particles in the outer optical cladding 6. By the coupling of light into the optical core 4 or the emission of light in the optical core 4, and the subsequent scattering of light, optical waveguide 10 may be used as a visual or intelligent line for a variety of applications.

According to an embodiment, and purely by way of example, a charging cable with integrated status display may be created using optical waveguide 10 and cable 1. For example, a charging cable (e.g., cable 1) for mobile electrical devices such as smartphones having visual effects may be provided by the present disclosure.

According to these embodiments, controlling of the spectrum and luminance of light emitted by the light-emitting elements is controlled by an electronic circuit (e.g., a microprocessor, an electronic controller, etc.). The electronic control circuit (not shown) may be located, for example, within the mobile electrical device. The electronic circuit supplies a control signal to the one or more light-emitting elements through wires that power the light-emitting elements. According to other embodiments, dedicated signal wires are connected to the one or more light-emitting elements. The electronic control circuit may be programmed to control the spectrum and luminance according to programming embedded in a non-transitory memory device (e.g., RAM). The programming may be preconfigured or may be user configurable. The signal from the electronic control circuit, in combination with driving the light emitter, e.g., LEDs, allow for the creation of specialized lighting effects. For example, when a smartphone has a low battery charge, a red color signal may be sent from the electronic circuit, which drives red LEDs of the optical waveguide. In a normal charging cycle the electronic circuit may supply a control signal such that a yellow flashing color is emitted by the optical waveguide. When the battery is fully charged, a green color signal may be supplied, such that the optical waveguide emits green light.

Furthermore, external sensors, for example, may detect the lighting conditions of the environment around the waveguide and cable, and the light-emitting elements can be controlled according to the detection results. For example, in a brighter environment, the light-emitting elements may be controlled, by way of the electronic control circuit, to emit light of higher intensity or greater luminance so that the light emitted by the optical waveguide is clearly visible despite the brighter environment. Similarly, in a darker environment, the intensity or the luminance of the light emitted from the light-emitting elements can be reduced. Such external sensors may be within the mobile electrical device, or remotely located.

According to another embodiment, and purely by way of example, a fluid pipe with integrated status display may be created using optical waveguide 10 and cable 1. For example, a conduit (e.g., cable 1) for carrying a gaseous or liquid chemical may be implemented with optical waveguide 10. Such a conduit may used, for example, in a laboratory setting.

According to these embodiments, controlling of the spectrum and luminance of light emitted by the light-emitting elements is controlled by an electronic circuit (e.g., a microprocessor, an electronic controller, etc.). The electronic control circuit (not shown) may be centrally located, remotely located, or otherwise connected to the optical waveguide. The electronic circuit supplies a control signal to the one or more light-emitting elements through wires that power the light-emitting elements. According to other embodiments, dedicated signal wires are connected to the one or more light-emitting elements. The electronic control circuit may be programmed to control the spectrum and luminance according to programming embedded in a non-transitory memory device (e.g., RAM). The programming may be preconfigured or may be user configurable. The signal from the electronic control circuit, in combination with driving the light emitter, e.g., LEDs, allow for the creation of specialized lighting effects. For example, sensors may be configured to detect when the gas or fluid within the conduit is leaking into the environment. Upon such detection, the electronic control circuit may be configured to cause red LEDs of the optical waveguide to emit light at the location of the leak. Similarly, if no leak is detected the optical waveguide may be configured to emit a green light. Furthermore, external sensors, for example, may detect the lighting conditions of the environment around the waveguide and cable, and the light-emitting elements can be controlled according to the detection results.

Although the above examples relate to power cables and fluid conduits, the present disclosure is not meant to be so limiting. It will be appreciated that the optical waveguide and associated electrical circuitry may be applied to many different types of cables/lines to provide intelligent displays. The electronic circuitry can monitor can be configured to monitor an array of properties of the cable/line and the surrounding environment. For example, sensors may be implemented to monitor electrical properties (e.g., voltage, current, resistance, etc.), mechanical properties (temperature, pressure, force, etc.), chemical properties (e.g., specific chemicals and/or compounds), and other properties (humidity, ambient lighting, etc.). The electronic control circuit can be programmed to selectively illuminate light sources associated with optical waveguide 10 based upon the output of the sensors.

With the aid of the optical waveguide 10 described herein and the assembly of cable 1 and optical waveguide 10 described herein, various advantages and effects can be realized. First, the complete cable sheath (also referred to as jacket) may be configured to shine or glow in a variety of colors, which may be dynamically controlled. Furthermore, coupling efficiency between the light-emitting elements and the waveguide is increased. In addition, the optical waveguide 10 described herein allows easy packaging compared to conventional solutions. Finally, a robust construction of the optical waveguide 10 and the cable assembly is possible. The embodiment described here of an inner optical cladding 2, an optical core 4 and an outer optical cladding 6 can also be adapted to other applications. For example, for the illumination of surfaces, the described annular optical waveguide 10 may be fabricated as a plate (structure: lower optical cladding, central optical core, and upper optical cladding having scattering properties, for example due to scattering particles).

What is claimed is:

1. An optical waveguide, comprising:
   an inner cladding;
   an optical core surrounding the inner cladding;
   an outer cladding surround the optical core; and
   a jacket surrounding the outer cladding;
   wherein the outer cladding is configured to at least partially reflect light into the core and scatter light out of the optical waveguide; and
   wherein the jacket is configured to homogenize light scattered by the outer cladding.

2. The optical waveguide of claim 1,
   wherein the optical waveguide is configured to be wrapped around a cable.

3. The optical waveguide of claim 1,
   wherein the inner cladding is configured to contact an outer surface of the cable.

4. The optical waveguide of claim 1,
   wherein the optical waveguide has a ring-like or annular shape.

5. The optical waveguide of claim 1,
   wherein the outer cladding comprises a plurality of light-scattering particles.

6. The optical waveguide of claim 2, further comprising:
   at least one light-emitting element,
   wherein the at least one light-emitting element is located within the optical core.

7. The optical waveguide of claim 6,
   wherein a first surface of the at least one light-emitting element contacts the inner cladding, and
   wherein a second surface of the at least one light-emitting element contacts the outer cladding.

8. The optical waveguide of claim 6,
   wherein light emitted by the at least one light-emitting element is controlled according to:
   a measured property of the cable;
   a measured property of the environment surrounding the optical waveguide; or
   combinations thereof.

9. A cable system, comprising:
   a central cable; and an optical waveguide surrounding the central cable, the optical waveguide comprising:
an inner cladding;
an optical core surrounding the inner cladding;
an outer cladding surround the optical core; and
a jacket surrounding the outer cladding;
wherein the outer cladding is configured to at least partially reflect light into the core and scatter light out of the optical waveguide; and
wherein the jacket is configured to homogenize light scattered by the outer cladding.

10. The cable system of claim 9,
wherein the central cable is a power cable or a conduit configured to transport a liquid or gas.

11. The cable system of claim 9,
wherein the inner cladding is configured to contact an outer surface of the central cable.

12. The cable system of claim 9,
wherein the optical waveguide has a ring-like or annular shape.

13. The cable system of claim 9,
wherein the outer cladding comprises a plurality of light-scattering particles.

14. The cable system of claim 10, further comprising:
at least one light-emitting element,
wherein the at least one light-emitting element is located within the optical core.

15. The cable system of claim 14,
wherein a first surface of the at least one light-emitting element contacts the inner cladding, and
wherein a second surface of the at least one light-emitting element contacts the outer cladding.

16. The cable system of claim 14,
wherein light emitted by the at least one light-emitting element is controlled according to:
a measured property of the central cable;
a measured property of the environment surrounding the optical waveguide; or
combinations thereof.

* * * * *